C. VAN DER LELY

3,077,067

DEVICE FOR THE LATERAL DISPLACEMENT OF CROP LYING ON THE GROUND

Original Filed Jan. 4, 1957

United States Patent Office 3,077,067

Patented Feb. 12, 1963

3,077,067
DEVICE FOR THE LATERAL DISPLACEMENT OF CROP LYING ON THE GROUND
Cornelis van der Lely, Zug, Switzerland, assignor to C. van der Lely N.V., Maasland, Netherlands
Original application Jan. 4, 1957, Ser. No. 632,445, now Patent No. 2,966,773, dated Jan. 3, 1961. Divided and this application Dec. 7, 1960, Ser. No. 74,443
Claims priority, application Netherlands Jan. 6, 1956
10 Claims. (Cl. 56—377)

This application is a division of application Serial No. 632,445 filed Jan. 4, 1957 and now Patent No. 2,966,773.

This invention relates to a device for the lateral displacement of crop lying on the ground comprising a main beam which lies obliquely to the intended direction of travel, a number of rake wheels coupled to said main beam by means of connecting elements and ground wheels for supporting the device, whereby at least one of said ground wheels is adjustable about a vertical axis and is lockable against rotation about said axis in different positions with regard to said main beam.

According to the invention there is provided a device of the kind set forth, wherein the connecting elements lie transverse to and extend rearwardly from the main beam, and near each end of the main beam a ground wheel is provided, whilst a drawbar is so connected to said main beam as to be adjustable about a vertical axis and lockable in different positions with respect thereto. In this way a simple and light device can be obtained.

For a better understanding of the invention and to show how the same may be carried into effect reference will now be made, by way of example, to the accompanying drawings, in which.

Figure 1:
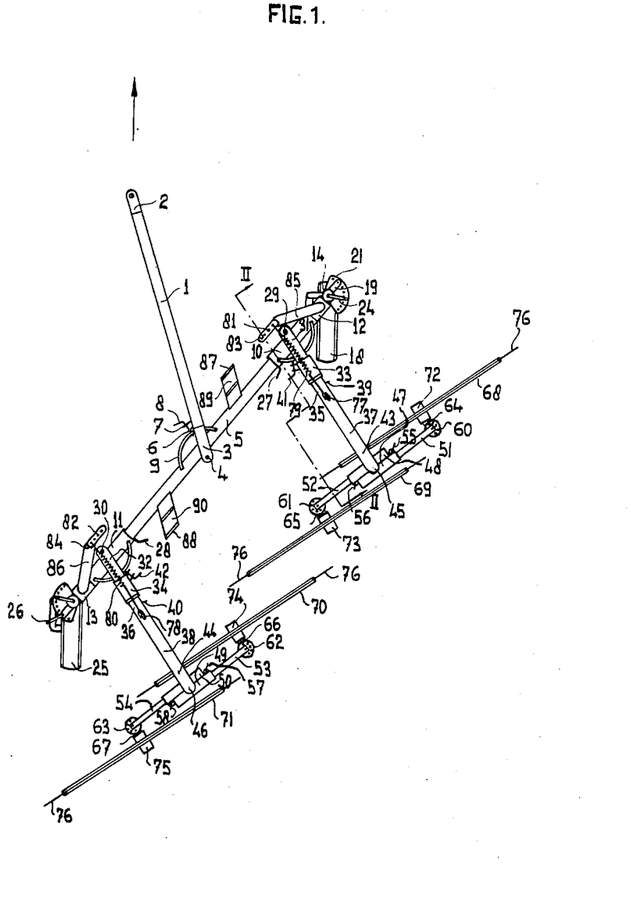
FIGURE 1 is a plan view of a device for laterally displacing crop lying on the ground, the device being shown in a working position in which it can act as a side delivery rake delivering to the left.
Figure 2:
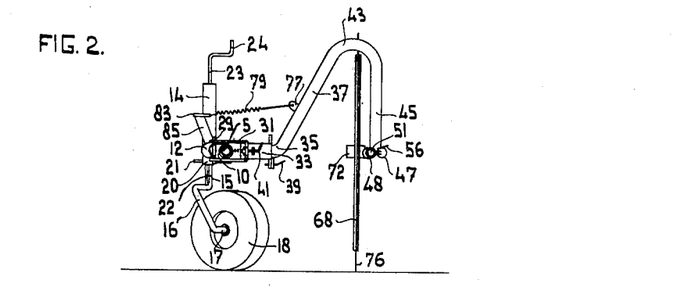
FIGURE 2 is a sectional view of the device in the working position shown in FIGURE 1 taken along the line II—II of FIGURE 1.

Referring now to FIGURES 1 and 2 of the drawings, there is shown a device for laterally displacing crop or the like material lying on the ground. The device has a drawbar 1 of which the front end 2 is perforated for attaching the drawbar to a tractor or the like for moving the device in the direction indicated by the arrow V. The rear end of the drawbar 1 is formed as a fork 3 which is pivotally connected to a frame member or beam 5 by means of a vertical hinge pin 4 and which can be fixed in a number of positions with regard to the beam 5 by means of a locking pin 8. The pin 8 can be inserted in apertures formed in lugs 6 and 7 connected to the arm 1, and can be passed through any one of a number of apertures formed in an arcuate strip 9 connected to the beam 5. The beam 5 is tubular, and near its ends, carries two sleeves 10 and 11. The sleeves 10 and 11 are held in place on the beam 5 by collars 12 and 13 mounted on the extremities of the beam 5, which collars 12 and 13 are detachable but are normally fixed so that they cannot rotate and move axially relative to the beam 5. The collar 12 is fixedly connected to a vertical tube 14 in which a vertical rod 15 (see FIG. 2) is carried. The lower extremity 16 of the rod 15 is connected to the horizontal axle 17 of a ground wheel 18. The axle 17 is, when seen in plan view, spaced from the centre line of the tube 14 so that the ground wheel 18 is a caster wheel. However, the wheel 18 can be fixed in a desired position by means of a locking device which comprises a perforated lug 19 fixedly connected to the tube 14, and a perforated sector 21 fixedly connected to a ring 20. The ring 20 can rotate about the axis of the tube 14, but is prevented from being withdrawn downwardly from the lower end of the tube 14 by a locking device. The rod 15 is further provided with a keyway 22 in which a projection on the ring 20 engages, thus preventing the ring 20 from being able to rotate about the rod 15. The ring 20 can be fixed with regard to the tube 14 in different positions by passing a locking pin through the aperture in the lug 19 and an aperture in the sector 21 when the apertures are in register. Thus the axle 17 cannot be turned about the axis of the tube 14 but can be moved upwardly or downwardly relative to the tube 14. The desired height of the axle 17 relative to the tube 14 can be adjusted by means of a screwed spindle 23 which engages in a screw-threaded aperture formed in the upper end of the tube 14, the spindle 23 being provided with a crank 24 for manual operation, and the lower end of the spindle resting against the upper end of the rod 15.

A ground wheel 25 is connected to the collar 13 in the same way as the ground wheel 18 is attached to the collar 12. The ground wheels 18 and 25 are preferably adjusted so that the collar 12 is at the same height above the ground as the collar 13 in all working positions of the device. In the working position shown in FIGURE 1 the ground wheel 18 acts as a free caster wheel, whilst the ground wheel 25 is fixed in position by means of a locking pin 26.

In the position shown in FIGURE 1 the sleeves 10 and 11 are held in position against the collars 12 and 13 by means of removable locking pins 27 and 28, which pass through the beam 5. The pins 27 and 28, however, do not prevent the sleeves 10 and 11 from rotating about the beam 5. The sleeves 10 and 11 are provided with hinge pins 29 and 30 about which forks 31 and 32 are rotatable, the hinge pins 29 and 30 having a substantially vertical position in most working positions. The forks 31 and 32 carry sockets 33 and 34, in which the substantially horizontal forward ends 35 and 36 of connecting elements in the form of arches 37 and 38 are fixed so as to be rotatable but axially non-displaceable. The sockets 33 and 34 are disposed at only a small distance from their respective sleeves 10 and 11, this distance being less than one sixth of the diameter of a rake wheel. The connecting elements 37 and 38 can be fixed against turning with respect to their sockets 33 and 34 by means of locking pins 39 and 40 (see FIGURE 2). The forks 31 and 32 can be fixed by means of locking pins 41 and 42 relative to the sleeves 10 and 11 in the same way as the draw-bar 1 can be fixed relative to the beam 5 by means of the locking pin 8.

It is possible to attach each hinge pin 29 or 30 behind its respective sleeve 10 or 11 instead of in front of the sleeve, in which case the arcuate strips (through apertures in which the locking pins 41 and 42 can be passed) would be mounted on the front of the sleeves 10 and 11. It is also possible to mount the sockets 33 and 34 on top of the forks 31 and 32 instead of in the prolongation of the forks 31 and 32, whereby a more compact construction is obtained.

The connecting elements 37 and 38 extend from their front ends 35 and 36 obliquely upwards to their highest points 43 and 44 from whence the rear ends 45 and 46 extend vertically downwards. The ends of the bows are connected to pairs of substantially horizontal tubes 47, 48 and 49, 50, the tubes 47, 48 and the end 45 being fixedly connected to one another, and the tubes 49, 50 and the end 46 being likewise fixedly connected one to the other. Rods 51, 52, 53 and 54 are rotatably and axially movably mounted in the tubes 47, 48, 49 and 50, the rods being capable of being fixed in the tubes by means of locking devices 55, 56, 57 and 58. One extremity of each rod 51—54 is disposed in its respective tube 47—50, whilst the free extremity is connected by means of a fixable hinge connection 60, 61, 62 or 63 to an axle 64, 65, 66 or 67 of a respective one of four rake wheels 68, 69, 70 and 71, the hubs 72, 73, 74 and 75 of which are freely rotatable about said axles. Each rake wheel lies close to the associated fixable hinge connection, the plane of a rake wheel being spaced from the hinge axis by a distance less than a quarter of the rake wheel diameter. The rake wheels are all of the same construction and each is provided with circumferential tines or teeth 76. It will be noted that the supporting structure for the rake wheels 68, 69 (or 70, 71), consisting of the described rods and tubes, lies between the rear face of the rake wheel 68 (or 70) and the front face of the succeeding rake wheel 69 (or 71).

The connecting elements 37 and 38 carry eyes 77 and 78, to which the rear ends of helical springs 79 and 80 are connected, the front ends of the springs 79 and 80 being connected to the upper ends 83 and 84 of rods 85 and 86 which are fixedly connected to the collars 12 and 13, the upper ends of the rods carrying apertured members 81 and 82. When the front end 2 of the draw-bar 1 is held at a certain height above the ground by means of a tractor or the like, the springs 79 and 80 serve to reduce the pressure of the rake wheels 68—71 on the ground.

In the position shown in FIGURES 1 and 2, the device can act as a side delivery rake delivering to the left, all movable connections, which are provided with locking devices, being fixed in the positions shown with the exception of the ground wheel 18, which acts as a free caster wheel and of the connecting elements 37 and 38 in the sockets 33 and 34, which are fixed in such a way that the connecting elements 37 and 38 can turn through a small angle in these sockets about axes which coincide with the centre lines of the sockets. These axes will hereinafter be identified as the balance axes. Due to this arrangement of the movable connections, the rake wheels 68 and 69, which together form a first group of rake wheels, exert equal pressures on the ground and likewise the rake wheels 70 and 71, which form a second group, also exert equal pressures on the ground. Since the eyes 77 and 78, to which the rear ends of the springs 79 and 80 are connected, are located higher than the axes of the sockets 33 and 34, and since the other ends of the springs are also located above these axes, the springs will tend to hold the connecting elements 37 and 38 each in an almost vertical plane.

The centre line of the beam 5 forms, for the sleeves 10 and 11 and thus for each of the groups of rake wheels a pivot axis, which will be herein referred to as the group-pivot-axis, i.e. that axis about which a group of rake wheels can be turned as a whole. The group-pivot-axis of a group of rake wheels lies substantially perpendicular to the balance axis of a group and at almost the same height above the ground as the hubs of the rake wheels of the group. A group of rake wheels can move up or down about the group-pivot-axis when the rake wheels move over an unevenness in the ground, and the rake wheels can make balancing movements also about their balance axis.

The beam 5 is provided with two supporting members 87 and 88, in recesses 89 and 90 of which the connecting elements 37 and 38 can rest when the device is in a transport position to be described hereinafter.

When the device shown in FIGURES 1 and 2 is drawn over a field, the crop lying on the ground in a strip in front of the rake wheels, will be delivered to the left of the rake wheel 71. The device, therefore, acts as a side delivery rake which delivers to the left.

By changing the height at which the ground wheels 18 and 25 support the beam 5 the sleeves 10 and 11 can be made to lie as high as, or lower, or higher than the axles 64—67 of the rake wheels. The higher the sleeves 10 and 11 are located, then the easier can the rake wheels be drawn over obstacles. The planes of the rake wheels can be made vertical or not by turning the rods 51—54 in the tubes 47—50 through a suitable angle, if required.

In the device just described, the highest points 43 and 44 of the connecting elements 37 and 38 are disposed below the highest points of the rake wheels 68—71. As these elements are supported at their ends by the rake wheels which can be made very flexible, the danger of breakage of the connecting elements 37 and 38 is small even though the greatest bending movement occurs at the highest points of these elements.

Figure 3:
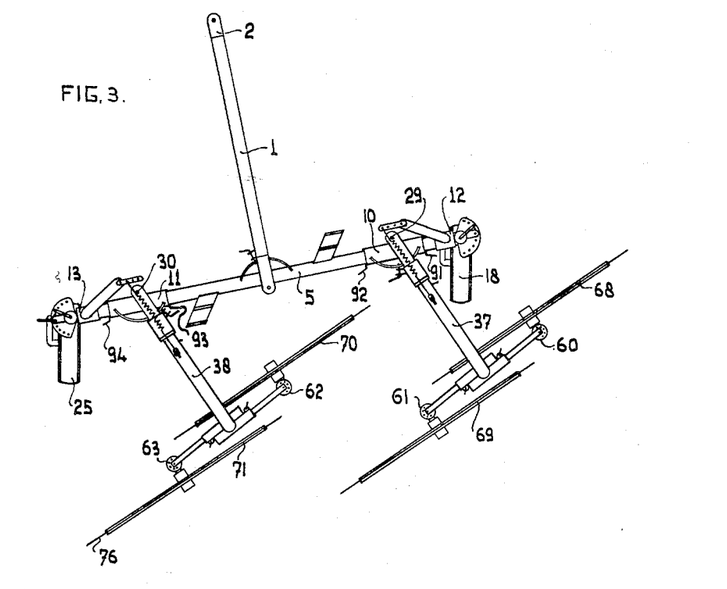
FIGURE 3 is a plan view of the same device in a working position in which it can act as a swath turner delivering to the left.

Referring now to FIGURE 3, the device is shown in a position which is different from the position shown in FIGURES 1 and 2, and in which the device can act as a swath turner. The ground wheel 25 and the draw-bar 1 are fixed in a different position relative to the beam 5. Further the connecting elements 37 and 38 are fixed at a different angle relative to the sleeves 10 and 11, and finally the sleeves 10 and 11 are brought together somewhat, being spaced apart from the collars 12 and 13. The sleeves 10 and 11 are, as before, freely rotatable about the beam 5, but pins 91 and 92 passed through the apertures in the beam 5 prevent axial movement of the sleeve 10, whilst axial movement of the sleeve 11 is prevented by like pins 93 and 94. In this position the rake wheels 68 and 69 are still in overlapping relation, since the left-hand portion of the front wheel 68 is disposed in front of the wheel 69, and the rake wheels 68 and 69 can together displace a swath over a short distance, the swath being turned once. However, the swath is not delivered further to the left by the rake wheel 70, as was the case with the corresponding rake shown in FIGURE 1, since the rake wheel 69 is now partly located behind the rake wheel 70. However, the rake wheels 70 and 71 can together turn another swath. By changing the distance of the sleeves 10 and 11 from one another, the device can be readily adapted to turn differently spaced swaths. The device can be adapted to turn swaths of different widths by changing the position of the connecting elements 37 and 38 relative to the sleeves 10 and 11 by adjusting the elements about the pins 29 and 30. A similar adjustment can also be made by moving the rods 51 and 52 in their tubes 47 and 48 and the rods 53 and 54 in their tubes 49 and 50. The arrangement of the rake wheels of a group with respect to a connecting element in the position shown in FIGURE 3 is the same as in the position shown in FIGURE 1.

Figure 4:
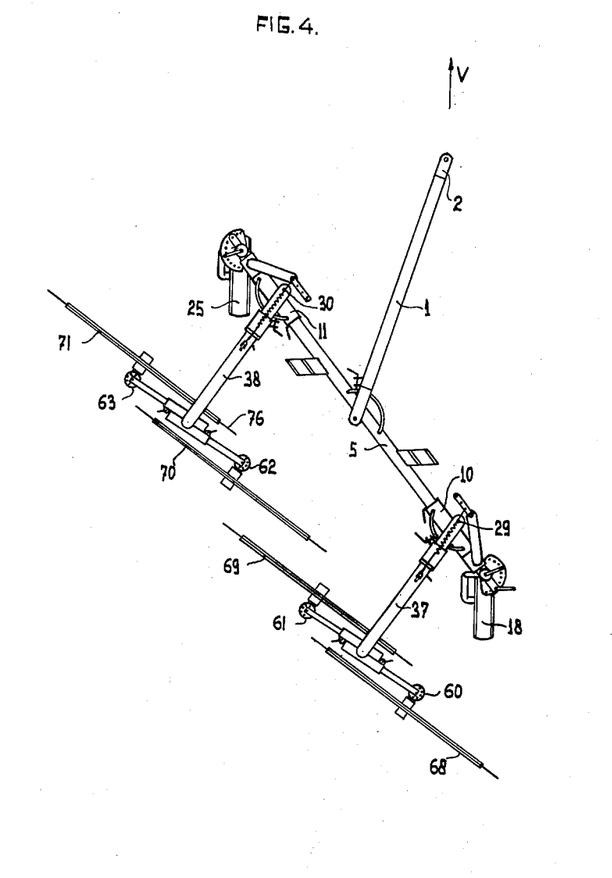
FIGURE 4 is a plan view of the device shown in FIGURE 1 in a working position in which it can act as a side delivery rake delivering to the right.

Referring now to FIGURE 4, the device is shown in a working position in which it can act as a side delivery rake adapted to deliver to the right. This working position can be obtained from that shown in FIGURE 3 by turning the rake wheels 68—71 about the vertical axes of the hinge connections 60—63, whilst the position of the draw-bar 1 is changed relative to the beam 5. Another difference between the working positions shown in FIGURES 3 and 4 is that in FIGURE 4 the ground wheel 25 is allowed to act as a free caster wheel and the ground wheel 18, which is now the rearmost wheel, is fixed. Also, the sleeves 10 and 11 are spaced further apart and the connecting elements 37 and 38 are turned through a small angle about the pins 29 and 30. The device shown in FIGURE 4 is a side delivery rake delivering to the right, and the rake wheels are arranged in overlapping relation to each other. When the position of the device is changed from that shown in FIGURES 1 or 3 to the position of FIGURE 4 with the device stationary, those teeth 76 which were the rearmost ones in the positions shown in FIGURE 1 or 3 are also the rearmost ones in the position shown in FIGURE 4. When in one of the working positions the rearmost teeth are directed downwardly in order to shed the crop easily, the rearmost teeth are, therefore, also directed downwardly in the other working position.

In the position shown in FIGURE 1, the device delivers crop to the left, whereas in that shown in FIGURE 4 the device delivers to the right. In the case of FIGURE 1, it will be noted that a line drawn through the centres of, say, the rake wheels 70 and 71, will intersect the rotational axis of the wheel 71 so as to define four quadrants, the wheel 71 lying in two opposite quadrants. If the same geometrical construction is made in respect of FIGURE 4, then it will be noted that the wheel 71 lies in the other two opposite quadrants.

It will be appreciated that the device shown in FIGURE 4 can be changed into a swath turner delivering to the right by placing the beam 5 somewhat more transverse to the travelling direction, and adjusting the setting of the groups of rake wheels so that the rake wheel 69 becomes positioned in front of the rake wheel 70. Of course, the positions of the draw-bar 1 and the fixed ground wheel 18 have to be altered for the new position of the beam 5, just as the positions of the draw-bar 1 and the ground wheel 25 are altered when the device is changed from the working position shown in FIGURE 1 to that shown in FIGURE 3.

Figure 5:
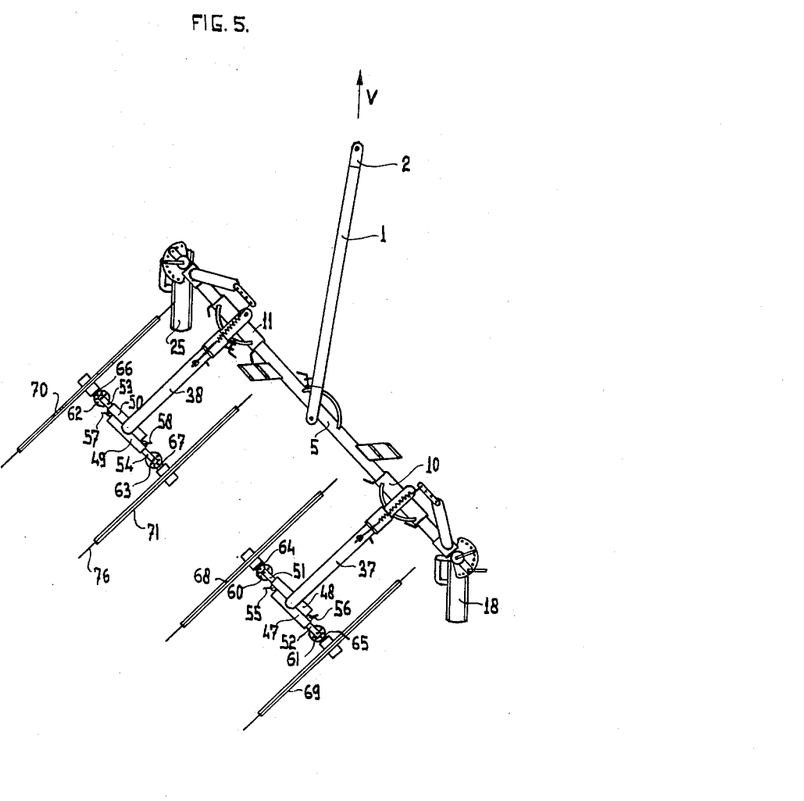
FIGURE 5 is a plan view of the same device in a working position in which it can act as a tedder delivering to the left.

The device can also be used as a tedder as is shown in FIGURE 5. The angle between the draw-bar 1 and the beam 5 has been altered to the required value, and the ground wheel 18 has been fixed in position, the ground wheel 25 acting as a free caster wheel. The connecting elements 37 and 38 are fixed so as to be substantially at right angles to the sleeves 10 and 11. To obtain the position of the device shown in FIGURE 5 from one of the positions already described, the axles 64—67 have furthermore to be brought so as to lie in prolongation of the rods 51—54 by turning the hinge connections 60—63. Moreover, in one group of rake wheels the locking devices 55 and 56 have to be temporarily released, and the rods 51 and 52 to be removed from the tubes 47 and 48 respectively and have to be replaced and fixed in the tubes 48 and 47 respectively, the rods being inserted further in the tubes than was previously the case. A similar change has to be made in the other group of rake wheels. The positions of the rake wheels 68 and 69 and the rake wheels 70 and 71 are thus changed so that if the rake wheel 71 in FIGURE 3 has teeth 76 directed downwardly at the rear, this rake wheel in FIGURE 5 will also have its teeth 76 directed downwardly at the rear, the same also applying for the other rake wheels.

The described tedder shown in FIGURE 5 is adapted to deliver to the left, but a tedder adapted to deliver to the right can be obtained by turning the draw-bar 1 through an angle of about 75° to the right, by allowing the ground wheel 18 to act as a free caster wheel, and by fixing the ground wheel 25 in a position turned through 90° to the right.

Figure 6:
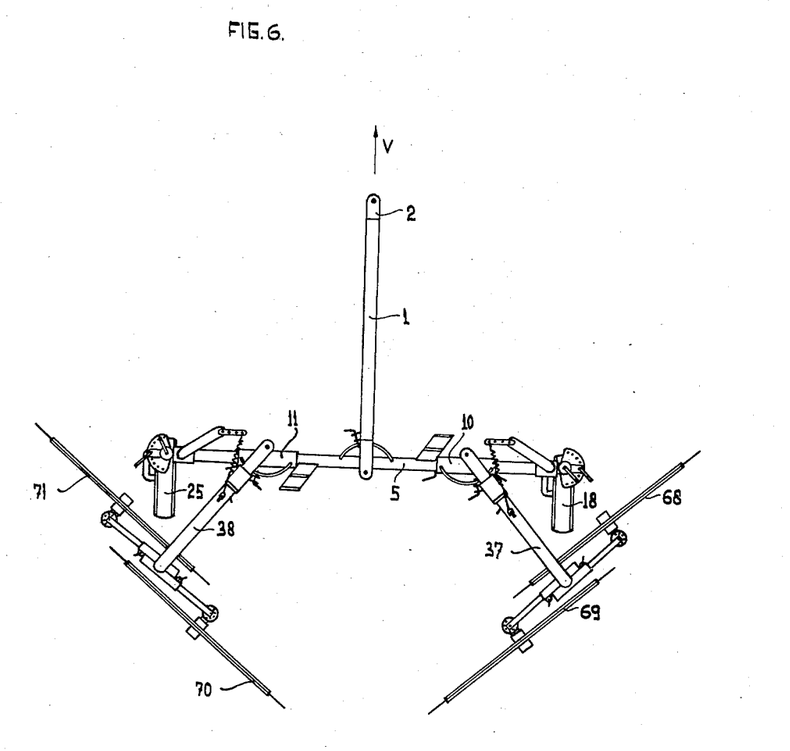
FIGURE 6 is a plan view of the same device in a working position in which it can act as a side delivery rake delivering to the centre.

Referring now to FIGURE 6, the device is shown in a position where it is adapted to act as a rake delivered to the centre. In this position the draw-bar 1 is disposed perpendicularly to the beam 5 and both the ground wheels 18 and 25 are fixed with their wheel planes perpendicular to the beam 5. The sleeves 10 and 11 have been moved as far as possible towards each other and have been prevented from moving axially, but are capable of freely rotating about the beam 5. The connecting elements 37 and 38 have been placed so as to be substantially at right angles to each other and have been fixed in relation to the sleeves 10 and 11. The rake wheels 68 and 69 are disposed in the same positions as in FIGURE 3 relative to the connecting element 37, whilst the rake wheels 70 and 71 are disposed in the same positions as in FIGURE 4 relative to the connecting element 38. When the device is moved in the direction of the arrow V, the material will be delivered as a swath on the strip of land between the rake wheels 69 and 70.

Figure 7:
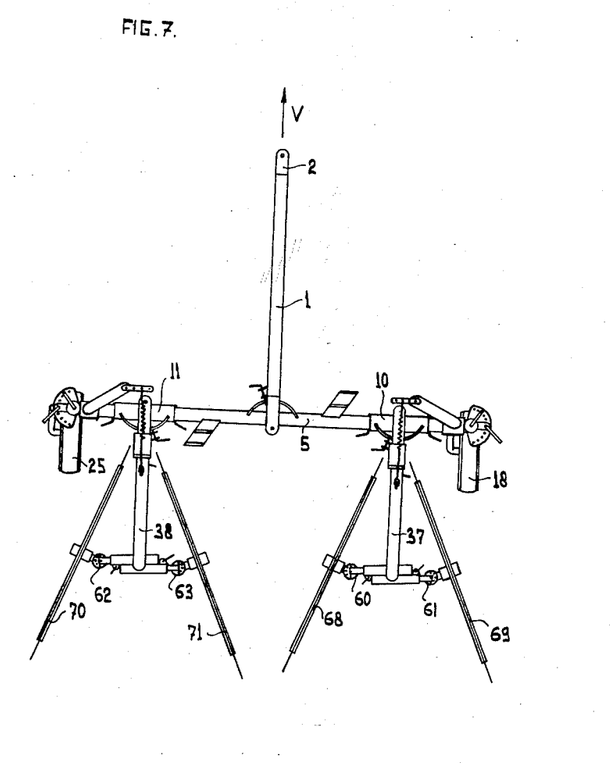
FIGURE 7 is a plan view of the same device in a working position in which it can act as a swath spreader.

In the position shown in FIGURE 7, the device is adapted to act as a swath spreader. The draw-bar 1 and the ground wheels 18 and 25 have the same positions relative to the beam 5 as in FIGURE 6, and the connecting elements 37 and 38 and the rake wheels have substantially the same positions relative to the beam 5 as in FIGURE 5 with the difference that the positions of the planes of the rake wheels 68—71 have been altered by rotating the hinge connections 60—63 in such a way that the foremost teeth of the rake wheels 68 and 69 are disposed nearer the connecting element 37 than the rearmost teeth, and that the foremost teeth of the rake wheels 70 and 71 are disposed nearer the connecting element 38 than the rearmost teeth. The sleeves 10 and 11 are placed at such a distance apart that the pairs of rake wheels 68, 69 and 70, 71 each work a swath. A swath worked by a pair of these rake wheels is pulled apart by the rake wheels so that the inner part of the swath is brought to the surface and as a result the swath can dry better.

Figure 8:
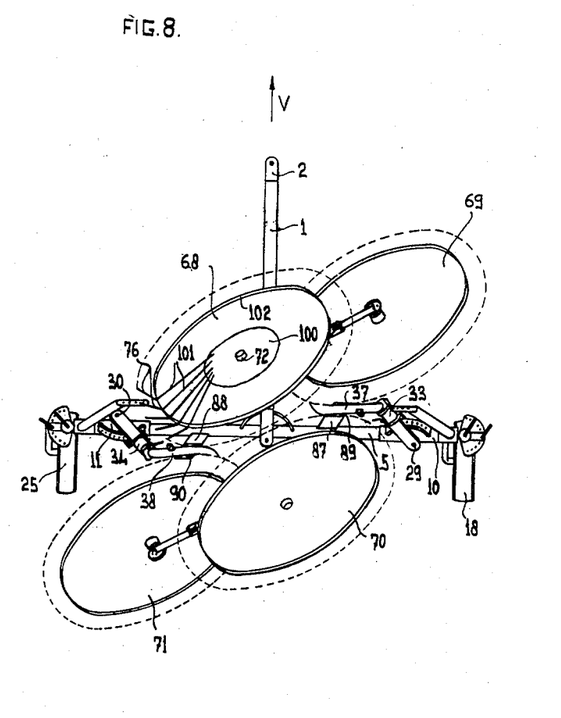
FIGURE 8 is a plan view of the device in a position in which the device can be transported.

Finally the device can be brought into a transport position which is shown in FIGURE 8. The position of the draw-bar 1, the beam 5 and the ground wheels 18 and 25 relative to each other is the same as in FIGURES 6 and 7, but the sleeves 10 and 11 have been moved as far apart from one another as possible.

Starting, for example, from the working position shown in FIGURE 4, the transport position can be obtained by first fixing the axles of the ground wheels 18 and 25 and the draw-bar 1 in the above-mentioned positions. Afterwards the locking devices preventing rotation of the connecting elements 37 and 38 in the sockets 33 and 34 and about the axes 29 and 30 are removed and the connecting element 38 is turned through an angle of about 30° to the right, whilst the connecting element 37 is turned through an angle of about 150° to the left. After this the connecting elements 37 and 38 are again fixed in the sockets 33 and 34, and the connecting elements 37 and 38 are lifted up and placed in the recesses 89 and 90 of the supporting members 87 and 88, which are connected to the beam 5. The rake wheels 68—71 are thus placed in the positions shown in FIGURE 8, where they are raised out of contact with the ground so that there is no danger that the rake wheels will come into contact with the ground during transport of the device.

In FIGURE 8 the construction of the rake wheel 68 is further shown. The hub 72 of this rake wheel is provided with a disc 100, to which spokes 101 are connected. The spokes 101 pass through apertures formed in a rim 102, and the prolongations of the spokes 101 extend outside the rim 102, the prolongations being bent outside the rim 102 so as to constitute the teeth 76. The rake wheels 69—71 which are all of the same construction, are shown only schematically in the drawing for the sake of simplicity.

What I claim is:

1. A device for laterally displacing material lying on the ground comprising a frame including a main frame beam which lies obliquely to the intended direction of travel thereof, a plurality of rake wheels, connecting elements supporting said rake wheels, vertical hinge means operatively associated with said frame beam and said connecting elements and supporting the latter on said frame beam, locking means for locking the connecting elements in different positions with regard to said frame beam, further vertical hinge means supporting the rake wheels on said connecting elements, and further locking means to fix the rake wheels in different positions with regard to said connecting elements.

2. A device as claimed in claim 1, comprising horizontal hinge means supporting the rake wheels on said connecting elements and locking devices for fixing the position of the rake wheels with respect thereto.

3. A device for laterally displacing material lying on the ground comprising a mobile frame including a main frame beam which lies obliquely to the intended direction of travel thereof, a plurality of rake wheels, connecting elements supporting said rake wheels and operatively associated with said main frame beam, said connecting elements extending rearwardly from said main frame beam, ground wheels on and supporting said frame, said ground wheels being coupled to the ends of said main frame beam, at least one of said ground wheels being adjustable about a vertical axis and lockable in different positions with respect to said main frame beam, vertical hinge means, and a draw arm connected to said main frame beam by said vertical hinge means and lockable in different positions with regard to said main frame beam.

4. A device as claimed in claim 3 wherein said ground wheels are swivel wheels and comprising means for fixing said swivel wheels in selected positions with respect to said main frame beam.

5. A device as claimed in claim 3 comprising vertical hinge means connecting said connecting elements to said main frame beam.

6. A device as claimed in claim 3 comprising means connecting said rake wheels to said connecting elements for adjustment about a substantially vertical axis.

7. A device as claimed in claim 3 wherein each connecting element includes opposite end portions, one of which is connected to said main frame beam, and the other of which supports one of said rake wheels.

8. A device as claimed in claim 3 wherein each said connecting element is adjustably supported for displacement along said main frame beam.

9. A device as claimed in claim 3 wherein said rake wheels are arranged in groups of two, each group being mounted on one of said connecting elements.

10. A device as claimed in claim 3, comprising means connecting said rake wheels to said connecting elements and providing for adjustment of the distance between the centers of said rake wheels.

References Cited in the file of this patent

UNITED STATES PATENTS

| 2,796,723 | Smith et al. | June 25, 1957 |
| 2,966,773 | Van der Lely | Jan. 3, 1961 |

FOREIGN PATENTS

| 1,083,596 | France | June 30, 1954 |